(12) United States Patent
Inoue et al.

(10) Patent No.: US 6,455,190 B1
(45) Date of Patent: Sep. 24, 2002

(54) BATTERY MODULE, AND CONNECTING STRUCTURE OF CELLS IN THE BATTERY MODULE

(75) Inventors: Hiroshi Inoue, Toyohashi (JP); Nobuyuki Matsunaka, Kashiwara (JP); Hiromi Kajiya, Toyohashi (JP)

(73) Assignees: Matsushita Electric Industrial Co. Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 165 days.

(21) Appl. No.: 09/665,471

(22) Filed: Sep. 20, 2000

(30) Foreign Application Priority Data

Sep. 21, 1999 (JP) .............................................. 11-267013

(51) Int. Cl.[7] .............................. H01M 6/42; H01M 2/24
(52) U.S. Cl. ..................... 429/160; 429/176; 429/149; 429/151; 429/156; 429/158; 320/107; 320/110; 320/112; 320/116
(58) Field of Search ................................. 429/160, 176, 429/149, 151, 156, 158; 320/107, 110, 112, 116

(56) References Cited

U.S. PATENT DOCUMENTS 3,844,841 A * 10/1974 Baker .......................... 136/111
4,339,049 A 7/1982 Gillespie
4,693,535 A * 9/1987 Frode .......................... 439/277

FOREIGN PATENT DOCUMENTS

| EP | 0669663 | 8/1995 | |
| EP | 0771037 | 5/1997 | |
| EP | 0771038 | 5/1997 | |
| EP | 0962993 A1 * | 12/1999 | ............ H01M/2/02 |
| EP | 0962993 | 12/1999 | |
| EP | 1059680 | 12/2000 | |
| JP | 07161377 | 6/1995 | |
| JP | 08031398 | 2/1996 | |
| WO | WO98031059 | 7/1998 | |
| WO | WO9921236 | 4/1999 | |

* cited by examiner

*Primary Examiner*—Patrick Ryan
*Assistant Examiner*—Angela J Martin
(74) *Attorney, Agent, or Firm*—Jordan and Hamburg LLP

(57) ABSTRACT

The battery module comprises a plurality of cells encased in prismatic cell cases having short lateral walls and long lateral walls coupled together as one piece. Each of the cells accommodates therein a group of electrode plates and liquid electrolyte, wherein collector plates are connected respectively to the groups of positive and negative electrode plates at opposite lateral edges thereof. Connection holes are formed at upper edge portions of the short lateral walls of the cell cases, and the collector plates are formed with connection bosses that fit into the connection holes, so that the connection bosses of the collector plates in neighboring cells are abutted each other and welded together, whereby two adjacent cells are connected to each other.

14 Claims, 11 Drawing Sheets

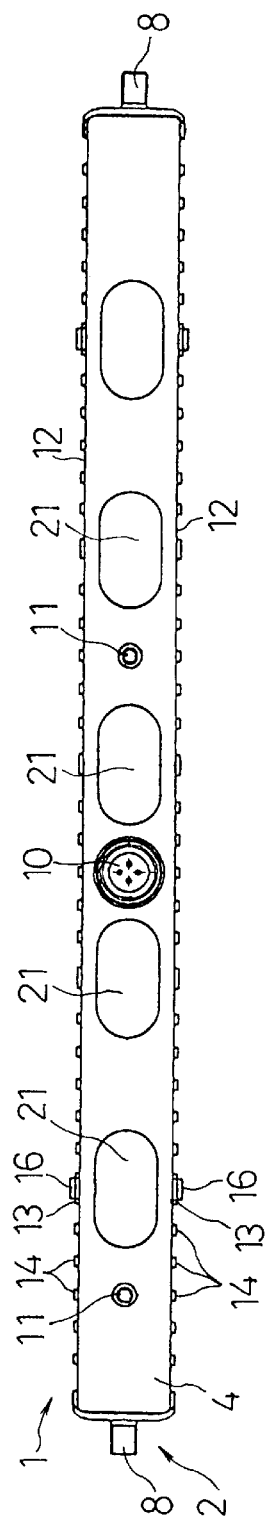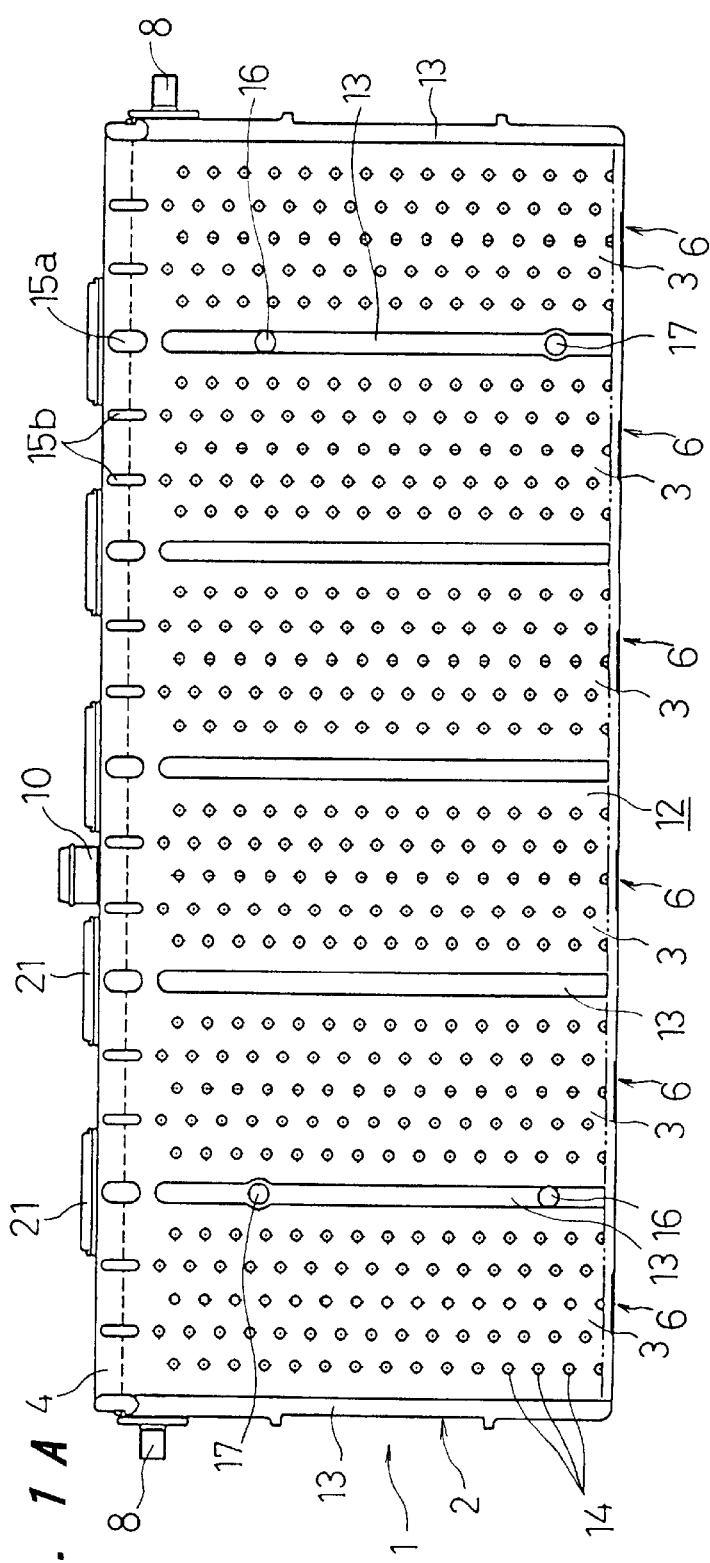
Fig. 1B
Fig. 1A

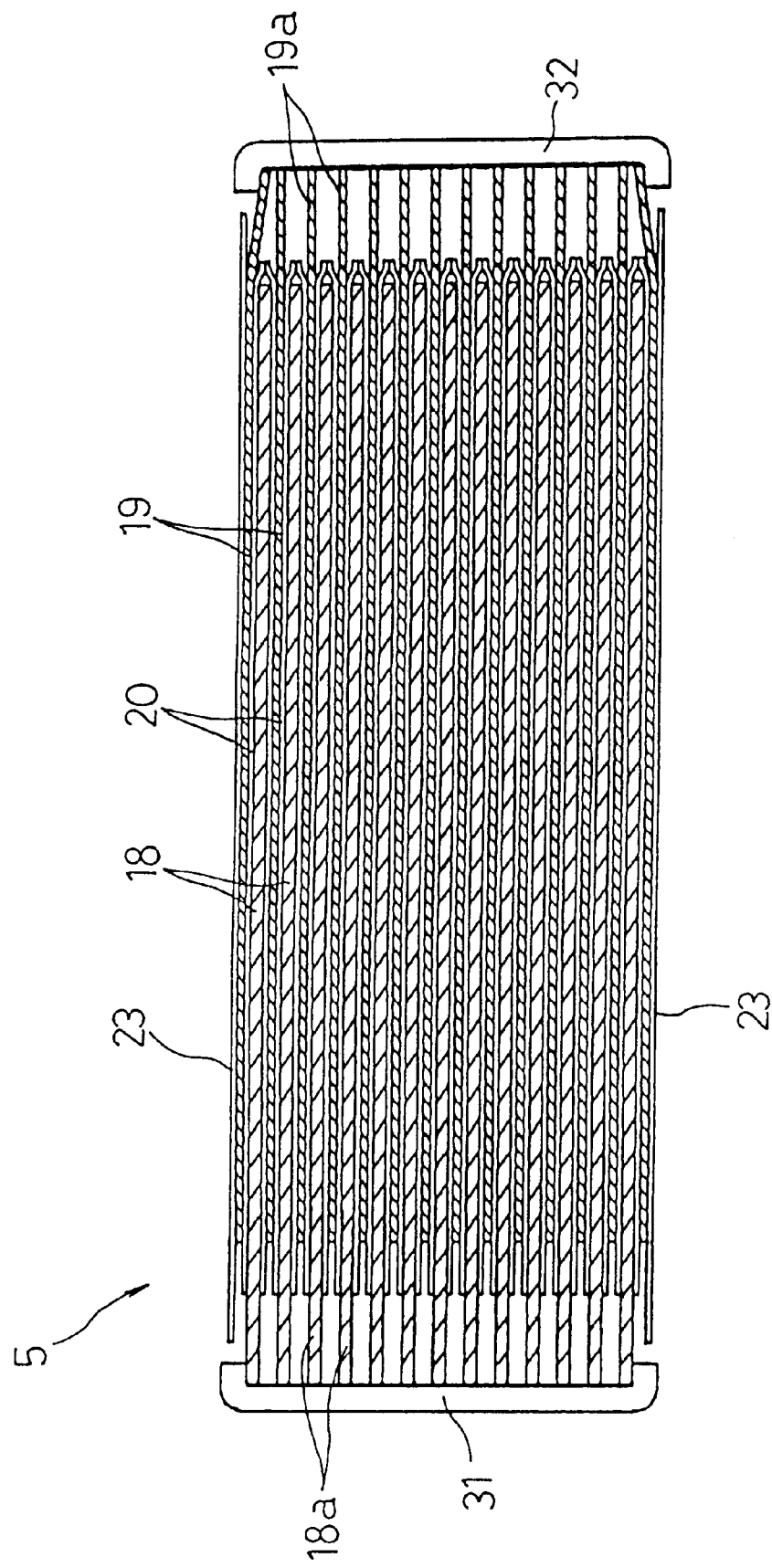

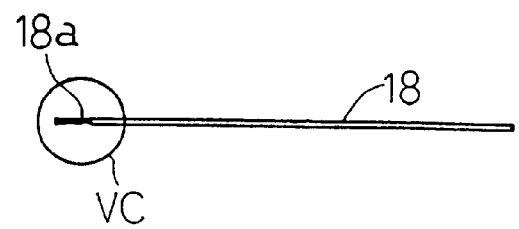
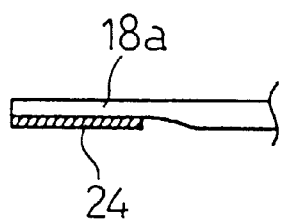
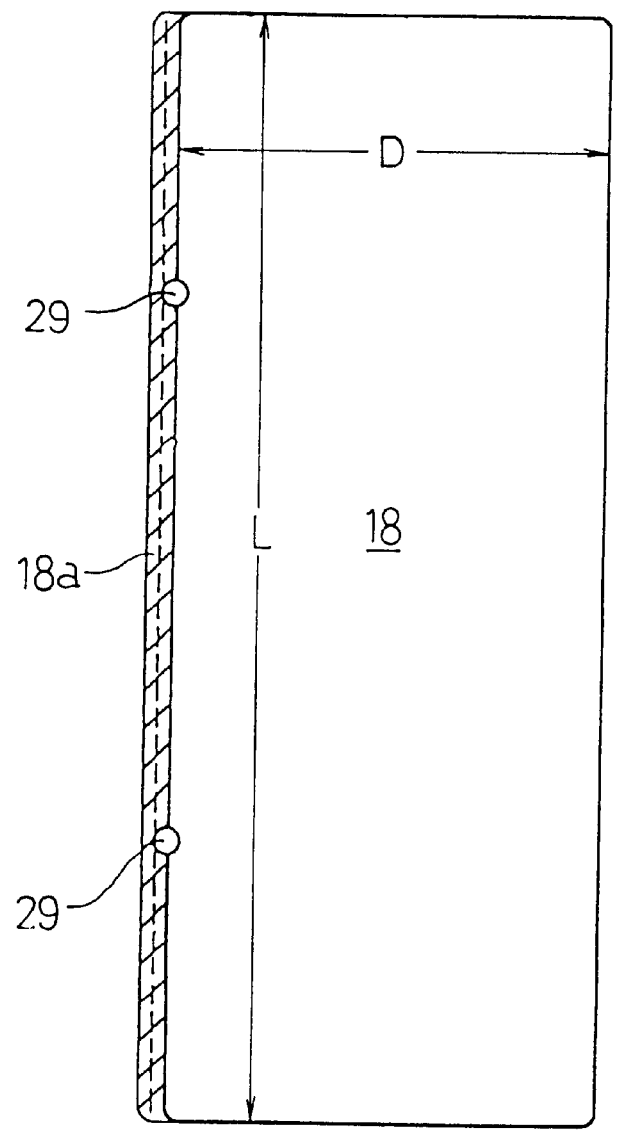

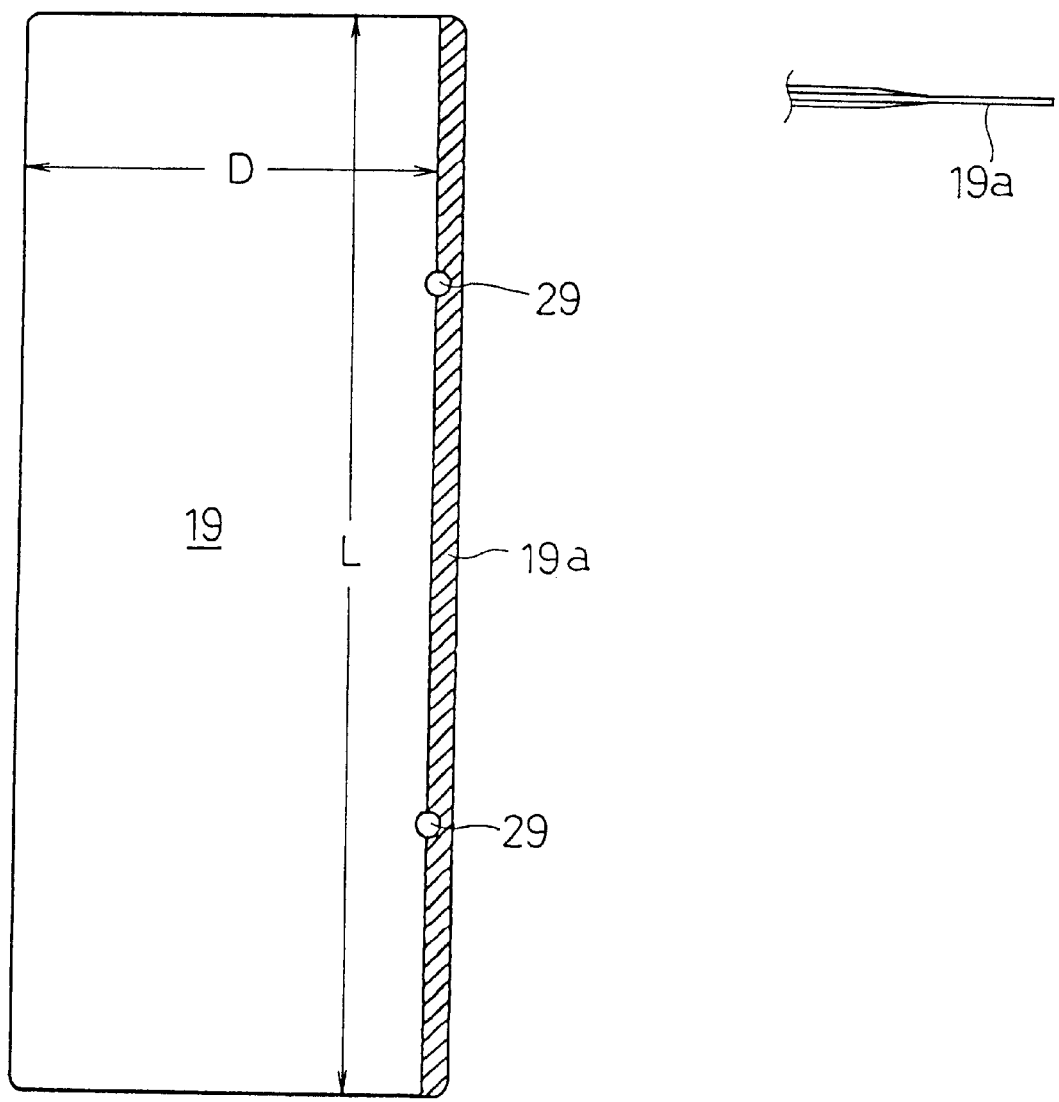

BATTERY MODULE, AND CONNECTING STRUCTURE OF CELLS IN THE BATTERY MODULE

BACKGROUND OF THE INVENTION

1. Field of the Invention

The present invention relates to a rechargeable battery, and more particularly, to a rechargeable battery that can be suitably applied for a battery module in which a plurality of such rechargeable battery cells are connected in series.

2. Description of Related Art

FIG. 11 shows a conventional battery pack made by connecting a plurality of rechargeable batteries and coupling them together as one so as to obtain a necessary power. In this battery pack, a plurality of cells 41 (41a to 41j) made of sealed alkaline rechargeable batteries as shown in FIG. 12 are arranged in a row, with the long lateral walls of the battery cases 42 adjacent each other. End plates 52 are arranged against the outside of the cells 41a and 41j at opposite ends, and the cells are coupled together as one piece with binding bands 53.

For the cells 41, as shown in FIG. 12, an electrode plate group 47, comprising positive electrode plates and negative electrode plates layered with intervening separators, thus constituting elements for electromotive force, is accommodated in a battery case 42 together with a liquid electrolyte, and the open end of the battery case 42 is closed with a lid 46 provided with a safety vent 45. From the upper end at one side of the positive electrode plates forming the electrode plate group 47, leads 49 extend upward and are connected to a positive electrode terminal 43 above them, and similarly, from the upper end of the other side of the negative electrode plates, leads 49 extend upward and are connected to an negative electrode terminal 44 above them. These positive electrode terminal 43 and negative electrode terminal 44 are then attached to the lid 46.

In FIG. 11, the positive electrode terminals 43 and negative electrode terminals 44 of coupled neighboring cells 41 are connected by connection plates 51, thereby connecting all cells 41 in series. When the battery cases 42 are coupled, ribs 48, which protrude vertically from the long lateral walls of the battery cases 42, are abutted against each other, forming coolant passages running in the vertical direction along the long lateral walls of the battery cases 42 in the space between ribs 48. The cells 41a to 41j are cooled by flowing air through these coolant passages.

With the configuration for the cells 41 of this conventional battery module, leads 49 extend from a portion at the upper end on one side of the electrodes and are connected to the electrode terminals 43 and 44, that are mounted to the lid 46, and further, the portions of the electrode terminals 43, 44 protruding above the lid 46 are connected with each other by the connection plates 51. As the connection between adjacent cells requires a complicated structure with a large number of components, costs are relatively high, and the electrical resistance at the connection is large. Moreover, since it is necessary to provide a space for the connection structure above the battery case 42, and since the connection structure is exposed to the outside, the space for installing this battery pack cannot be made compact.

Moreover, in the portions where electrode pillars of the electrode terminals 43 and 44 extend through the lid 46, O-rings for providing a seal are usually placed only on the inner side of the lid 46, and there was the danger that electrolyte may leak during the use of battery.

SUMMARY OF THE INVENTION

In view of these problems of the prior art, it is an object of the present invention to provide a battery module, comprising a plurality of rechargeable batteries, which can be constructed at low cost and in which cells are simply connected to each other. A further object of the present invention is to provide a battery module, of which installation space can be made compact, and in which there is no danger of electrolyte leakage.

To achieve the above object, the present invention provides a rechargeable battery, comprising:
- a prismatic case having short lateral walls and long lateral walls;
- a group of electrode plates encased in said prismatic case together with a liquid electrolyte;
- a positive electrode collector plate and a negative electrode collector plate attached to the group of electrode plates at long lateral opposite ends thereof;
- a connection hole formed in the short lateral walls of the prismatic case; and
- a connection boss formed in said positive electrode collector plate and the negative electrode collector plate such as to fit into said connection hole.

According to the present invention, two neighboring cells are connected together via connection bosses that are formed in the collector plates of the electrode plate group. Therefore, the connection structure of two cells is simply constructed without any extra components and thus at low cost. Moreover, thanks to the compact connection structure between the cells, the space for installation of the battery module can be made compact.

A sealing material can be arranged around the connection boss for providing a seal against the outside, whereby the connection hole is sealed double from both sides and leakage of electrolyte during the use of battery can reliably be prevented.

The connection boss in the collector plates may be formed by compression molding such that the connection boss is protruded on one side of the collector plate, so that the connection boss can integrally be formed with the collector plate with high productivity and at low cost. When welding the leading ends of the abutted connection bosses together, a pair of welding electrodes having protrusions at their ends can be used, wherein the protrusions of the welding electrodes are respectively inserted into the cavities formed on the backside of the connection bosses. Thereby, pressure can be concentrated at the leading ends of the connection bosses and the welding can be performed favorably. The connection structure with small electric resistance can thus be obtained with high reliability.

Alternatively, a reinforcing member may be embedded in a cavity that is formed on the backside of said connection boss such that the reinforcing member is flush with a plate surface around said cavity. In-this case, welding of the leading ends of the connection bosses can favorably be accomplished even with welding electrodes having flat distal end surfaces. That is, even with the welding electrodes without protrusions as mentioned above, pressure can be concentrated at the welding portion, whereby the welding can be performed favorably, and the connection structure with small electric resistance can be achieved reliably. Moreover, since the welding electrodes need only be formed flat at their distal ends, they can be used longer, and the overall cost for the manufacture of the battery can be reduced.

Alternatively, the connection boss may be formed with an annular projection in an outer peripheral portion at a protruding end of the connection boss. In this case also, welding electrodes with flat distal end surfaces can be used, by which pressure is transferred and concentrated at the annular projection at the outer periphery of the leading ends of the bosses. At the same time, the annular projections of the two connection bosses that are abutted each other form an annular welding line, whereby a large welding area can be attained, and the welding is performed favorably. The connection structure with small electric resistance can thereby be achieved reliably. Moreover, welding electrodes having flat distal end surfaces can be employed even without the reinforcing members as mentioned above that are embedded in the cavities, and therefore, the overall cost for the manufacture of the battery can be reduced.

The rechargeable battery of the present invention can advantageously be applied to constitute a battery module, wherein an integral battery case is comprised of a plurality of the rechargeable batteries as described above. Upper open ends of the plurality of cell cases are integrally closed by an integral lid member. In accordance with the present invention, neighboring cells can be connected within the integral battery case, and the connection structure between the cells is not exposed to the outside. Thereby, a battery module according to the present invention is more compact and requires less installation space than conventional battery modules.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 1A is a front view and FIG. 1B is a top plan view showing a battery module according to a first embodiment of the present invention;

FIG. 4 is a cross-sectional view taken along IV—IV in FIG. 3;

FIG. 5A is a front view, FIG. 5B is a top plan view, and FIG. 5C is an enlargement of VC in FIG. 5B, showing the positive electrode plate in the same embodiment;

FIG. 6A is a front view, FIG. 6B is a top plan view, and FIG. 6C is an enlargement of VIC in FIG. 6B, showing the negative electrode plate in the same embodiment;

DESCRIPTION OF PREFERRED EMBODIMENTS

Preferred embodiments of a battery module according to the present invention will be hereinafter described with reference to FIGS. 1 to 7.

Figure 2:
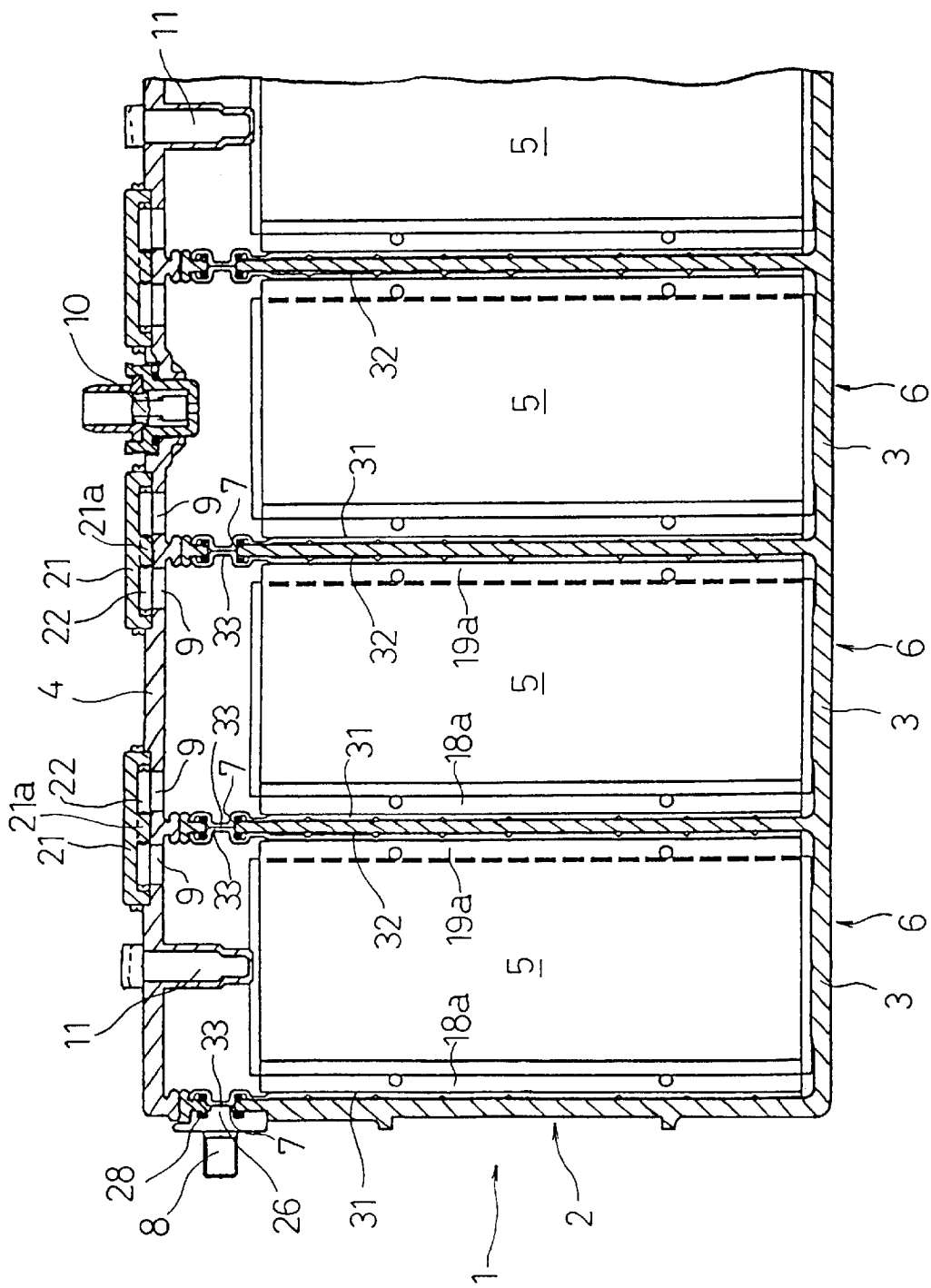
FIG. 2 is a partial longitudinal cross-sectional side view of the same embodiment.

The battery module of this embodiment is a nickel metal hydride battery, which is suitable for use as a drive power source for an electric vehicle. As shown in FIGS. 1 and 2, the battery module 1 is made up of a plurality of (six in the example shown in the drawing) cells 6, arranged in a row. Cell cases 3 of each of the cells 6, which are formed in a prismatic fashion with short lateral walls, long lateral walls, and open top ends, are mutually integrated on their short lateral walls, thereby constituting an integral battery case 2. The upper open ends of the cell cases 3 are closed all together by an integral lid member 4.

Each of the battery cases 3 constitutes a cell 6, accommodating therein electrode plate groups 5 together with electrolyte. An electrode plate group 5 comprises a large number of positive electrode plates and negative electrode plates arranged parallel to the long lateral walls of the cell cases 3 and layered in the direction of the short lateral walls of the cell cases 3, with intervening separators therebetween. The construction inside the battery case will be described later in more detail.

Connection holes 7 are formed at the upper edge portions of the outer short lateral walls of the cell cases 3 at the two ends of the integral battery case 2 and between each two cell cases 3. Positive and negative connection terminals 8 are respectively mounted to the connection holes 7 at the outer short lateral walls of the two outer cell cases 3, and the intervening cells 6 are connected in series with each other through the connection holes 7 in the short lateral walls between each two cell cases 3.

On the top face of the lid member 4, through holes 9 are formed in adjacent edge portions of neighboring cell cases 3. Communicating lids 21 forming communicating paths 22 for connecting two through holes 9 are welded onto the lid member 4. Numeral 21$a$ denotes reinforcing protrusions protruding from the middle of the inner wall of the communicating lids 21. The size of the reinforcing protrusions 21$a$ is such that they do not close the communicating paths 22, and their leading ends are abutted against and welded to the top face of the lid member 4, ensuring the pressure strength of the communicating lids 21.

The integrated battery case 2, the lid member 4 and the communicating lids 21 are made of a synthetic resin material, such as a PP/PPE alloy, and they are repellent against the electrolyte. It is also possible to make only the lid member 4 and the communicating lids 21 of an electrolyte-repellent material, or to provide only the surface of the communicating paths 22 with a coating of a fluid-repellent material.

A single safety vent 10 for releasing pressure when the internal pressure in the cell cases 3 has exceeded a certain value is provided on the top face of the lid member 4. Moreover, a sensor mounting hole 11 for mounting a temperature detection sensor that detects the temperature in the cells 6 is formed as an indentation, the bottom end of which contacts the upper edge of the electrode plate group 5 of one of the cells 6.

The long lateral walls of six cells 6 together form an integral side wall 12 of the integral battery case 2. On this side wall 12 of the integral battery case 2, protruding ribs 13 that extend vertically are provided at positions corresponding to the lateral edges of two adjacent cell cases 3. Further, a large number of relatively small circular protrusions 14 are formed at suitable intervals in matrix fashion between each two ribs 13. The ribs 13 and the protrusions 14 have the same height. Furthermore, coupling ribs 15a and 15b having the same height as the ribs 13 and the protrusions 14 are formed on the side walls of the upper edge of the cell cases 3 and the side walls of the lid member 4, such as to bridge across the side walls of the cell cases 3 and the lid member 4, at positions corresponding to an extension of the ribs 13 and the protrusions 14. A plurality of protrusions 16 and indentations 17, for positioning and fitting together integral battery cases 2 when their side walls 12 are abutted on each other, are arranged at an upper portion and a lower portion of the outer surface of the two ribs 13 near both ends of the side wall 12 of the integral battery case 2. When a plurality of integral battery cases 2 are arranged in a row in parallel to constitute a battery pack, the ribs 13, the protrusions 14 and the coupling ribs 15a and 15b form coolant passages for cooling the cell cases 3 effectively and uniformly.

Figure 3:
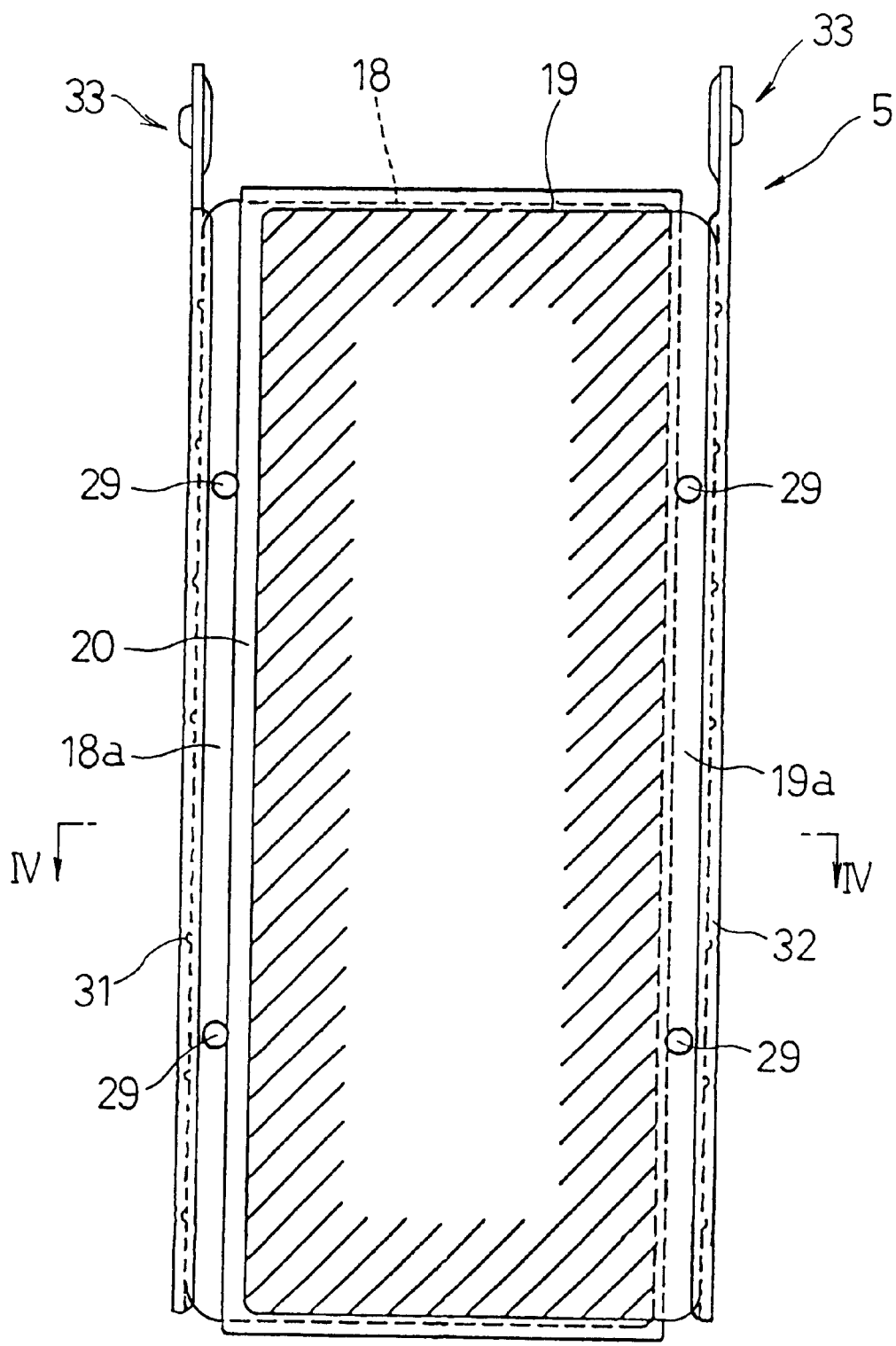
FIG. 3 is a front view of the electrode plate group of the same embodiment.

The aforementioned electrode plate groups 5 are explained in detail with reference to FIGS. 3 to 6. In FIGS. 3 and 4, a plurality of positive electrode plates 18 and negative electrode plates 19 are arranged alternately, and the positive electrode plates 18 are covered with separators 20 in the form of a bag having an opening on one side. The positive plates 18 and the negative plates 19 are stacked upon one another with separators 20 therebetween, thereby constituting the electrode plate group 5. In FIG. 3, the region where the positive electrode plates 18 and the negative electrode plates 19 oppose each other with the intervening separators 20 and generate electric power is indicated by oblique lines. The lateral edges of the group of positive electrode plates 18 protrude beyond the group of negative electrode plates 19 on one side, and the lateral edges of the group of negative electrode plates 19 protrude beyond the group of positive electrode plates 18 on the opposite side, and these protruding lateral portions form the lead portions 18a and 19a, to the lateral ends of which collector plates 31 and 32 are welded, respectively. The outer edges of the collector plates 31 and 32 are bent toward the inside as shown in FIG. 5, in order to restrict the dimensions of the electrode plates 18, 19 during the collector plates 31, 32 are welded to the electrode plates 18, 19, so that the electrode plates 18, 19 do not spread outwards as pressure is applied thereto. Numeral 23 denotes external separators arranged at the outer faces of the electrode plate group 5 between the collector plates 31 and 32.

The positive electrode plates 18 are made of Ni foamed metal. As shown in FIGS. 5A–5C, the lead portion 18a is constructed by compressing one lateral edge of the plate of foamed metal and attaching a lead plate 24 on one surface of the lead portion 18a by ultrasonic welding or seam welding. The negative electrode plates 19 shown in FIGS. 6A–6C are made of Ni punched metal coated with an active material except for lead portions 19a. "L" denotes the length of a side of the positive electrode plate 18 and the negative electrode plate 19 where the lead portions 18a and 19a are provided, and "D" denotes the length of the side in a direction perpendicular thereto. The positive and negative electrode plates 18, 19 are configured so that "L" is larger than "D", but not larger than four times "D".

Numeral 29 denotes pairs of positioning holes formed in the lead portions 18a and 19a at a suitable distance from the top and the bottom thereof. By inserting positioning pins into these positioning holes 29 and by applying pressure on the lateral ends of the lead portions 18a and 19a, these lateral ends of the lead portions 18a and 19a are aligned and welded reliably and evenly to the collector plates 31 and 32.

Figure 7A:
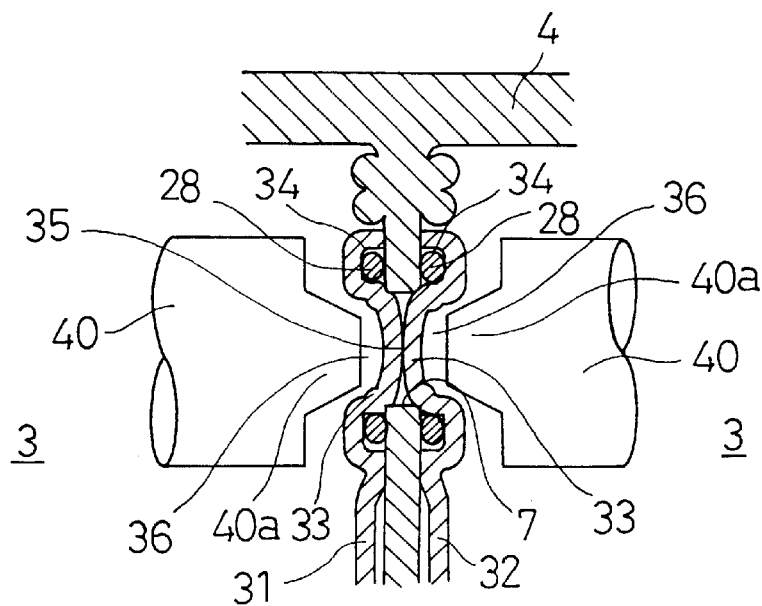
FIG. 7A is a vertical cross-sectional view showing the configuration for connecting two cells and FIG. 7B is a detailed cross sectional view of the connection boss of the collector plate in the same embodiment.

FIG. 7A shows the connection structure for serially connecting the cells 6. As shown, the upper ends of the collector plates 31, 32 are formed with connection bosses 33 that protrude and enter into the connection hole 7 formed in the upper end portion of the short lateral walls between two adjacent cell cases 3. The leading ends of these connection bosses 33 are abutted each other and welded together, whereby the connection plate 31 of one cell 6 is connected to the connection plate 32 of the adjacent cell 6. Similarly, the connection terminals 8 that are connected to the two cells at both ends of the battery module are respectively formed with connection bosses 26, so that the connection plate 31 or 32 of the cells at the opposite ends of the battery module is connected to the connection terminals 8 by welding the leading ends of the connection bosses 26 and 33. An annular groove 34 is formed such as to surround the connection boss 33, and an O-ring 28 is fitted in this groove 34 to form a seal with the short lateral walls of the cell cases 3. Therefore, the connection hole 7 is sealed double with the O-rings 28 from both sides of the short lateral wall of the cells.

Figure 7B:
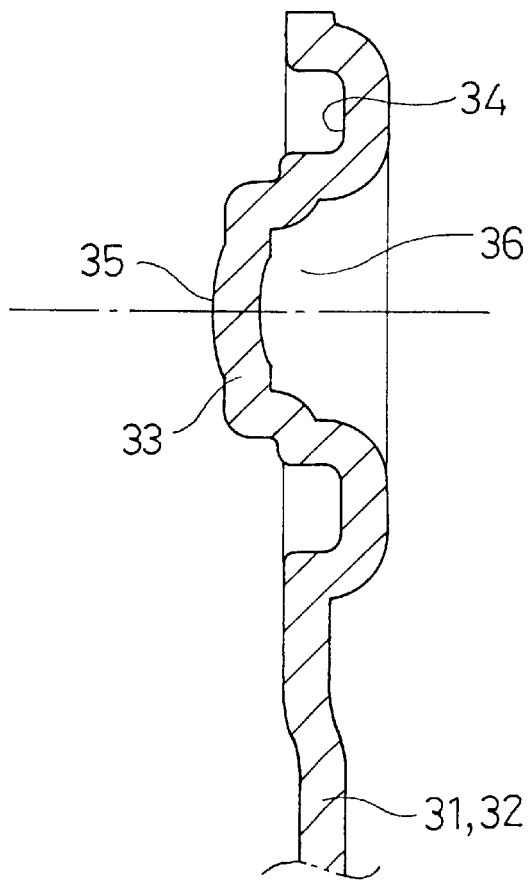

The connection boss 33 is formed such as to project from one side of the collector plate 31 or 32 by compression molding, and to have a welding projection 35 that protrudes most in the center of the boss 33, as shown in FIG. 7B. For the welding of these welding projections 35 at the leading ends of the connection bosses 33, a pair of welding electrodes 40 having projections 40a as shown in FIG. 7A are used, the projection 40a being inserted into the cavity 36 on the opposite side of the connection boss 33 for pressing the backside of the welding projection 35.

In the battery module 1 of the present invention, as described above, the integral battery case 2 is constituted by mutually connecting a plurality of prismatic cell cases 3, wherein the intervening cell cases 3 share their short side walls. The open ends of the cell cases 3 are closed by the integrated lid member 4, and the collector plates 31, 32 of the electrode plate groups 5 in adjacent cells 6 are connected via the connection bosses 33 of the collector plates 31, 32, that pass through the connection holes 7 formed in the upper edges of the short side walls of each cell case 3, the leading ends of the connection bosses being welded together. Therefore, neighboring cells 6 can be connected inside the integral battery case 2. Since the connection configuration is not exposed to the outside, the installation space for the battery module 1 can be made compact.

Furthermore, the neighboring cells 6 are connected in series through the connection bosses 33, that are simply formed by compression-molding the collector plates 31, 32 that constitute the electrode plate groups 5. Therefore, no extra components for the connection structure of the cells is required, and cells can be simply connected at low cost with a reduced number of components. Moreover, since the connection bosses 33 are formed integrally with the collector plates 31, 32, and since they are welded together at one point, the electric resistance at the connection structure can be remarkably reduced.

Figure 10:
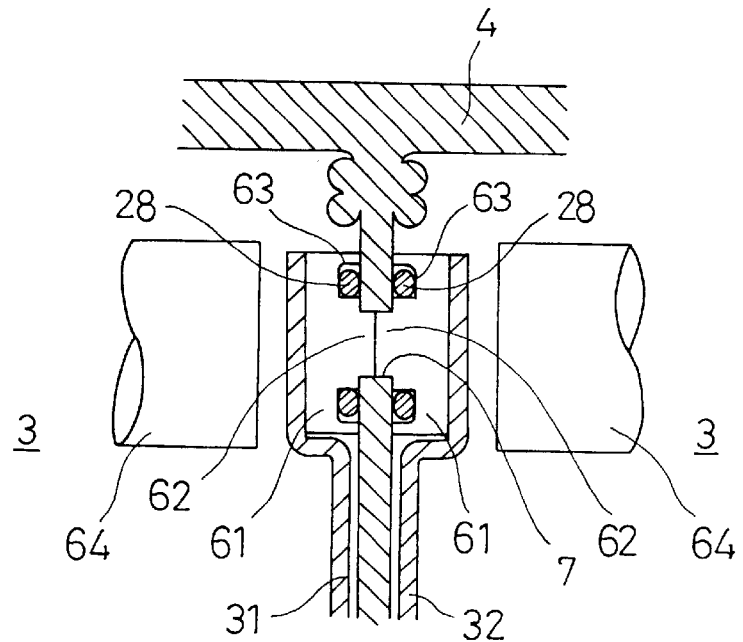
FIG. 10 is a vertical cross-sectional view showing the configuration for connecting two cells according to an invention previously made by the inventors of the present application.
Figure 11:
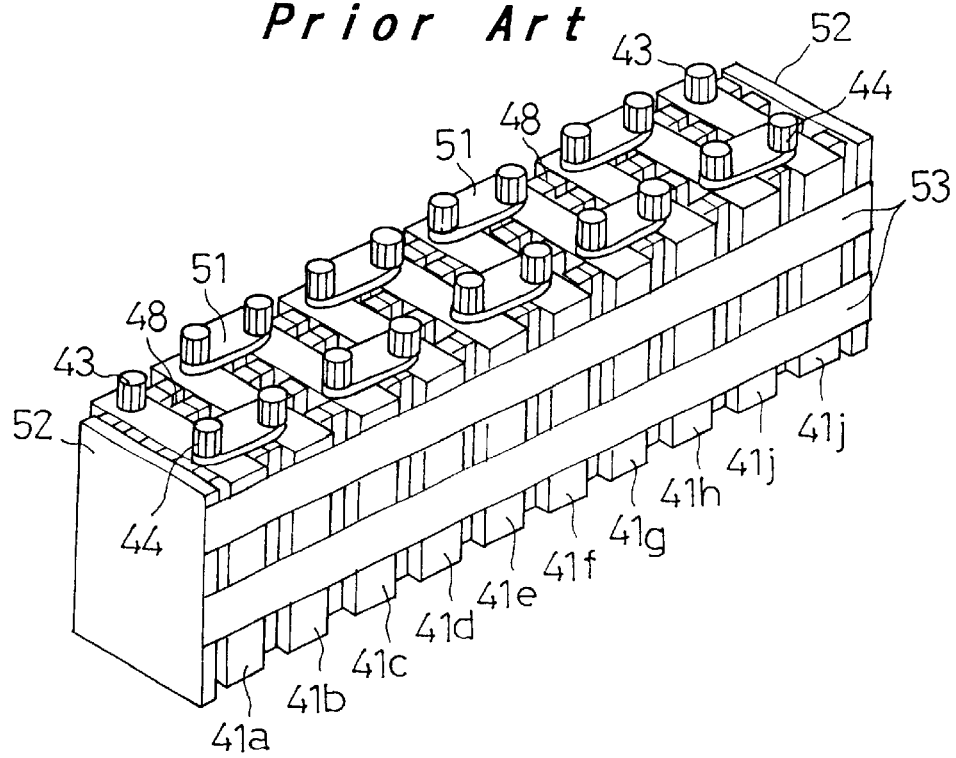
FIG. 11 is an external perspective view of a conventional battery module.
Figure 12:
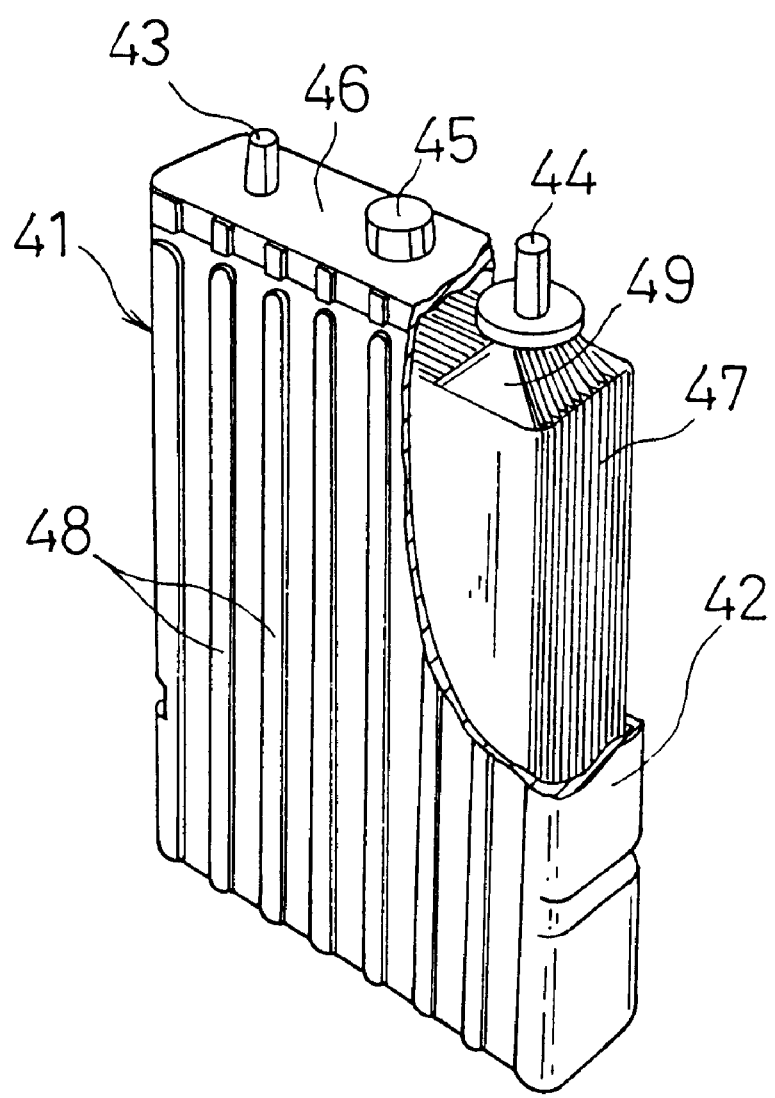
FIG. 12 is a partially cutaway perspective view of a cell of the same conventional example.

FIG. 10 shows a connection structure that has been proposed by the inventors of the present application previously, wherein a pair of connection fittings 61 respectively having connection protrusions 62 on one side in the center thereof and annular grooves 63 surrounding the connection protrusions. The connection protrusions 62 of the connection fittings 61 are inserted into the connection holes 7 formed in the short lateral walls between the cell cases 3 from both sides, and the connection holes 7 are sealed by O-rings 28 fitted in the annular grooves 63. For connecting neighboring cells 6, the pair of connection fittings 61 is arranged between the upper ends of the collector plates 31, 32, and with these connection fittings 61 being sandwiched between a pair of welding electrodes 64, 64, electricity is applied thereto. Thereupon, the upper ends of the collector plates 31, 32 and the connection fittings 61, and the leading ends of the connection protrusions 62 of the pair of connection fittings 61, are simultaneously welded together.

In this case, however, the pair of connection fittings 61 is additionally needed, and moreover, there was the problem that since the welding occurs at three points, i.e., between the collector plate 31 and one connection fitting 61, between the leading ends of the abutted connection protrusions 62, and between the collector plate 32 and the other connection fitting 61, the electric resistance at the connections structure was relatively large. The present invention resolves such problems, as it requires no extra components such as connection fittings 61, whereby the operability of the assembling process is improved, and the overall cost can be reduced.

Moreover, by using the welding electrodes 40 that have projections 40a as described above, pressure can be concentrated at the welding projections 35 at the leading ends of the connection bosses 33, whereby the welding can be performed favorably, and the connection structure with little electric resistance can be achieved highly reliably.

Likewise, the connection terminals 8 having similar connection bosses 26 can be simply connected to the collector plates 31 or 32 of the outer cells 3 at opposite ends of the battery module, whereby the battery module can be connected to the outside with a compact structure.

Furthermore, the connection hole 7 in a short lateral wall between two neighboring cells 6 is sealed double from both sides by the O-rings 28 that are provided around the connection bosses 33 of the collector plates 31, 32 or the connection bosses 26 of the connection terminals 8, whereby leakage of liquid during the use of battery can be prevented reliably.

In the electrode plate groups 5 of the cells 6, the lateral edge portions of the group of positive electrode plates 18 protrude beyond the group of negative electrode plates 19 on one side, and the lateral edge portions of the group of negative electrode plates 19 protrude beyond the group of positive electrode plates 18 on the opposite side, and these protruding lateral portions form the lead portions 18a and 19a, to which collector plates 31 and 32 are welded over their entire length. Therefore, the average distance from the surfaces of the electrodes 18 and 19 to the collector plates 31 and 32 can be made short, and as a result, the internal battery resistance can be made small and the utilization rate of the electrode active material becomes large, which increases the battery output.

Moreover, the groups of electrode plates 18 and 19 are held in a simple construction by attaching the lateral edge portions of the lead portions 18a and 19a of the electrode plates 18 and 19 to the collector plates 31 and 32, whereby the surface area of the regions for generating an electromotive force becomes large, and the battery capacity can be increased.

The length L of a side of the electrode plates 18, 19 where the lead portions 18a, 19a are provided, and the length D of the side orthogonal to L are set $D<L \leq 4D$, so that the average distance from the entire surfaces of the electrode plates to the collector plates 31, 32 can be made even shorter. If $L>4D$, the aspect ratio (vertical/horizontal) becomes too large, which leads to the problem with regard to other structural conditions, such as maintaining the strength of the collector plates 31 and 32 or manufacture of the cell cases 3.

Furthermore, at the neighboring ends of two adjacent cell cases 3, 3, holes 9 are formed in the lid member 4, and a communication lid 21 is welded onto the lid member 4 for forming a communicating path 22 that runs through the holes 9. Thereby, the internal pressure of the plurality of cells 6 is made uniform, and there is no risk that internal pressure of some of the cells 6 rises and the life of these cells 6 is shortened. Life of the overall battery module can thereby be prevented from being diminished. Also, since only one safety vent 10 needs to be provided in the lid member 4, a reduction in cost can be achieved.

Next, another embodiment of the present invention will be described with reference to the FIGS. 8A and 8B. In the foregoing embodiment, a pair of welding electrodes 40 having projections 40a at its end are used for pressing the backside of the welding projection 35 and welding the abutted welding projections 35 of the connection bosses 33. In this embodiment, a reinforcing member 37 is embedded in the cavity 36 formed on the backside of the welding projection 35 such as to be flash with the plate surface of the collector plate 31 or 32 around the cavity 36 as shown in FIG. 8B.

Figure 8A:
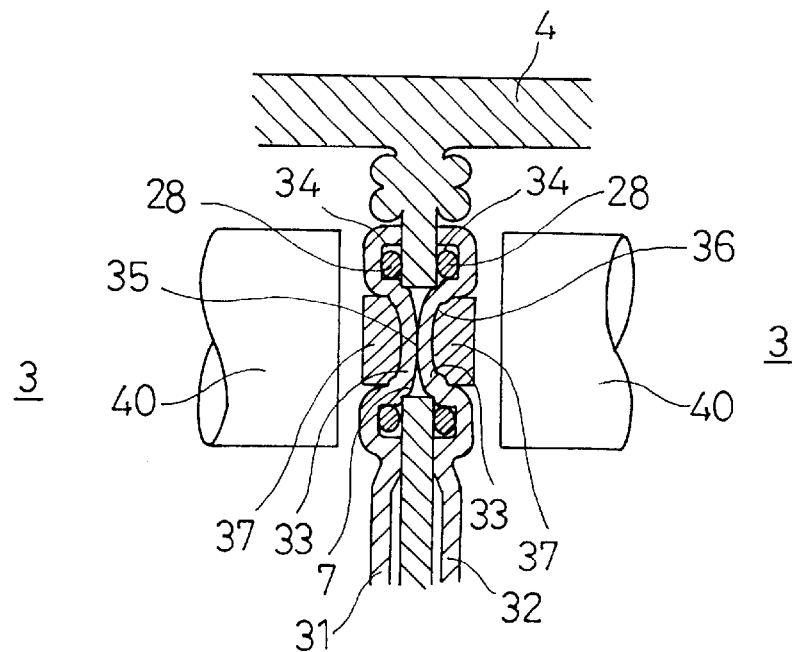
FIG. 8A is a vertical cross-sectional view showing the configuration for connecting two cells and FIG. 8B is a detailed cross sectional view of the connection boss of the collector plate in another embodiment.
Figure 8B:
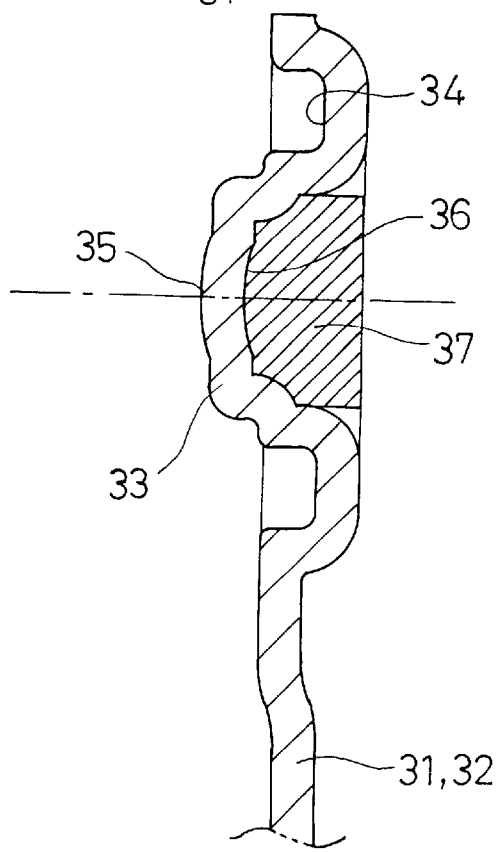

By adopting this construction, even if welding electrodes 40 having flat leading surfaces are used for welding the abutted welding projections 35 of the connection bosses 33 as shown in FIG. 8A, pressure can be concentrated at the welding portion between the welding projections 35, whereby the welding can be performed favorably, and the connection structure with small electric resistance can be achieved reliably. Moreover, since the welding electrodes 40 need only be formed flat at their distal ends, they can be used longer, and the overall cost for the manufacture of the battery can be reduced.

Figure 9A:
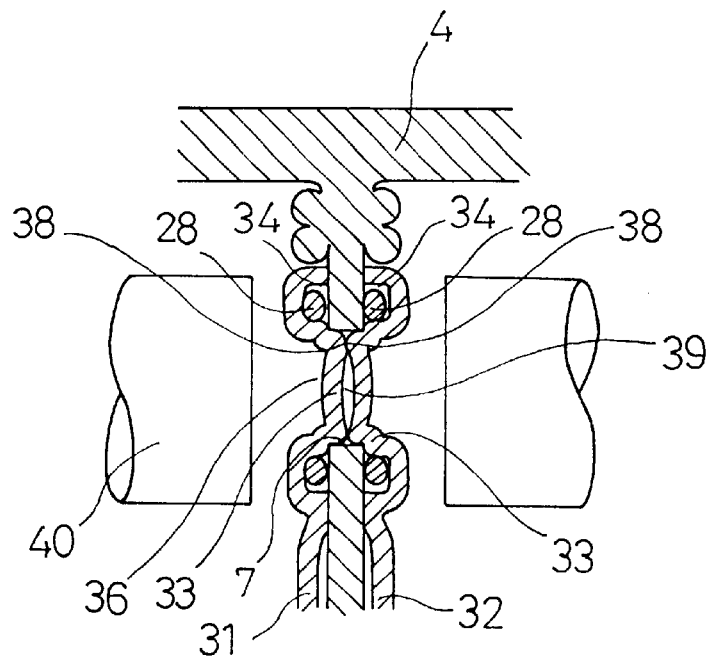
FIG. 9A is a vertical cross-sectional view showing the configuration for connecting two cells and FIG. 9B is a detailed cross sectional view of the connection boss of the collector plate in yet another embodiment.
Figure 9B:
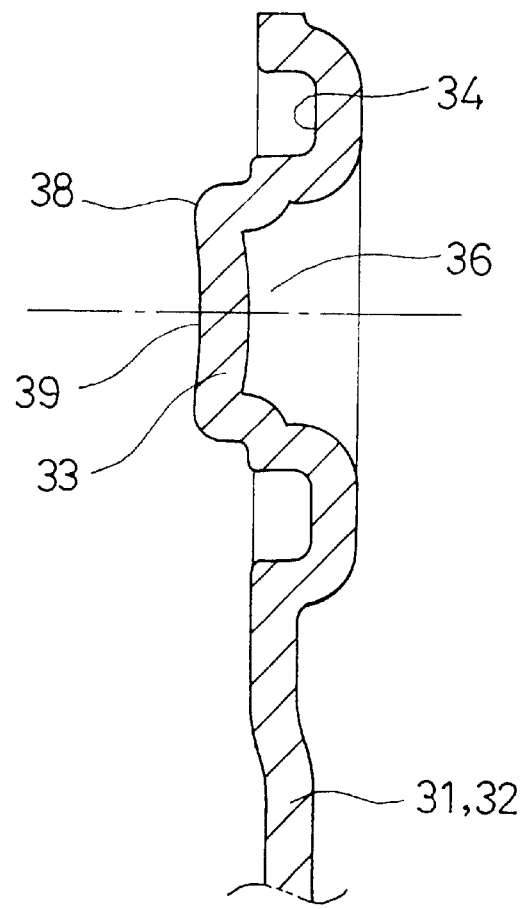

Next, another embodiment of the present invention will be described with reference to FIGS. 9A and 9B. As shown in FIG. 9B, the connection bosses 33 of the collector plates 31, 32 in this embodiment are formed with a slightly recessed indentation 39 at the leading ends in the center, and an annular projection 38 at the outer periphery surrounding this indentation 39.

By adopting this configuration, even if welding electrodes 40 with flat leading surfaces are used for pressing the back side of the connection bosses 33, the pressure is transferred and concentrated at the annular projections 38 at the outer periphery of the leading ends of the bosses. At the same time, the annular projections 38 of the two connection bosses 33 that are abutted each other form an annular welding line, whereby a large welding area can be attained, and the welding is performed favorably. The connection structure with small electric resistance can thereby be achieved reliably. Moreover, welding electrodes 40 having flat distal end surfaces can be employed as shown in FIG. 9A, even without the reinforcing members 37 as mentioned above that are embedded in the cavities 36, and therefore, the welding electrodes 40 can be used longer, and the overall cost for the manufacture of the battery can be reduced.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A rechargeable battery comprising:
   a prismatic case having short lateral walls and long lateral walls;
   a group of electrode plates encased in said prismatic case together with a liquid electrolyte;
   a positive electrode collector plate and a negative electrode collector plate attached to the group of electrode plates at long lateral opposite ends thereof;
   a connection hole formed in the short lateral walls of the prismatic case; and
   a connection boss formed in said positive electrode collector plate and the negative electrode collector plate such as to fit into said connection hole.

2. The rechargeable battery according to claim 1, wherein a sealing material is arranged around said connection boss for providing a seal against the outside.

3. The rechargeable battery according to claim 1, wherein the connection boss is formed by compression molding such that the connection boss is protruded on one side of the positive electrode collector plate or the negative electrode collector plate.

4. The rechargeable battery according to claim 3, wherein a reinforcing member is embedded in a cavity that is formed on the backside of said connection boss such that the reinforcing member is flush with a plate surface around said cavity.

5. The rechargeable battery according to claim 3, wherein said connection boss is formed with an annular projection in an outer peripheral portion at a protruding end of the connection boss.

6. A battery module comprising:
   an integral battery case comprising a plurality of cell cases with long lateral walls and short lateral walls arranged side by side such that intervening cell cases share the short lateral walls with adjacent cell cases, each of said cell cases accommodating therein a cell comprising a group of electrode plates, a liquid electrolyte, and a positive electrode collector plate and a negative electrode collector plate attached to the group of electrode plates at long lateral opposite ends thereof;
   a lid for integrally closing upper open ends of the plurality of cell cases;
   connection holes formed in the short lateral walls of each of the cell cases;
   connection bosses formed in said positive electrode collector plate and the negative electrode collector plate such as to fit into said connection holes; and
   outside connection terminals that are connected to the two cells located at opposite ends of the battery module and that are provided with connection bosses similar to said connection bosses; wherein
   a leading end of a connection boss formed in a collector plate of one polarity in an intervening cell is abutted and welded to a leading end of a connection boss formed in a collector plate of an opposite polarity in an adjacent cell; and
   a leading end of a connection boss formed in a collector plate in a cell located at either end of the battery module is abutted and welded to a leading end of said connection boss formed in one of said outside connection terminals.

7. A battery comprising:
   a case having at least one inner wall;
   a first group of electrode plates encased in said case together with an electrolyte;
   a first positive electrode collector plate and a first negative electrode collector plate attached to the first group of electrode plates at opposite ends thereof;
   a second group of electrode plates encased in said case together with an electrolyte;
   a second positive electrode collector plate and a second negative electrode collector plate attached to the second group of electrode plates at opposite ends thereof;
   a connection hole formed in the at least one inner wall of said case; and
   a connection boss formed in at least one of said first positive electrode collector plate and said second negative electrode collector plate such as to fit into said connection hole and effect connection of the first positive electrode collector plate and the second negative electrode collector plate.

8. The battery according to claim 7, further comprising a sealing material arranged around said connection hole.

9. The battery according to claim 7, wherein the connection boss is formed by compression molding such that the connection boss is protruded on one side of the first positive electrode collector plate or the second negative electrode collector plate.

10. The battery according to claim 9, further comprising a reinforcing member embedded in a cavity formed on a backside of the connection boss so that the reinforcing member is flush with a plate surface around the cavity.

11. The battery according to claim 9, wherein said connection boss is formed with an annular projection in an outer peripheral portion at a protruding end of the connection boss.

12. The battery according to claim 7, further comprising a lid for integrally closing the case.

13. The battery according to claim 7, further comprising:
   the case having an end wall with a second connection hole formed in the end wall;
   a second connection boss formed in the first negative electrode collector plate; and
   an outside terminal, wherein the first negative electrode collector plate is connected to the outside terminal through the second connection hole by the second connection boss.

14. The battery according to claim 7, further comprising:
   the case having an end wall with a second connection hole formed in the end wall;
   a second connection boss formed in the second positive electrode collector plate; and
   an outside terminal, wherein the second positive electrode collector plate is connected to the outside terminal through the second connection hole by the second connection boss.

* * * * *

UNITED STATES PATENT AND TRADEMARK OFFICE
Certificate

Patent No. 6,455,190 B1                                Patented: September 24, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hiroshi Inoue, Toyohashi (JP); Nobuyuki Matsunaka, Kashiwara (JP); Hiromi Kajiya, Toyohashi (JP); and Masaru Masaki, Aichi (JP).

Signed and Sealed this Twelfth day of May 2009.

GREGORY MILLS
*Supervisory Patent Examiner*
Art Unit 1700